Feb. 14, 1933.　　　M. H. PÉREZ　　　1,897,140
MECHANICAL MOVEMENT
Original Filed Aug. 27, 1925
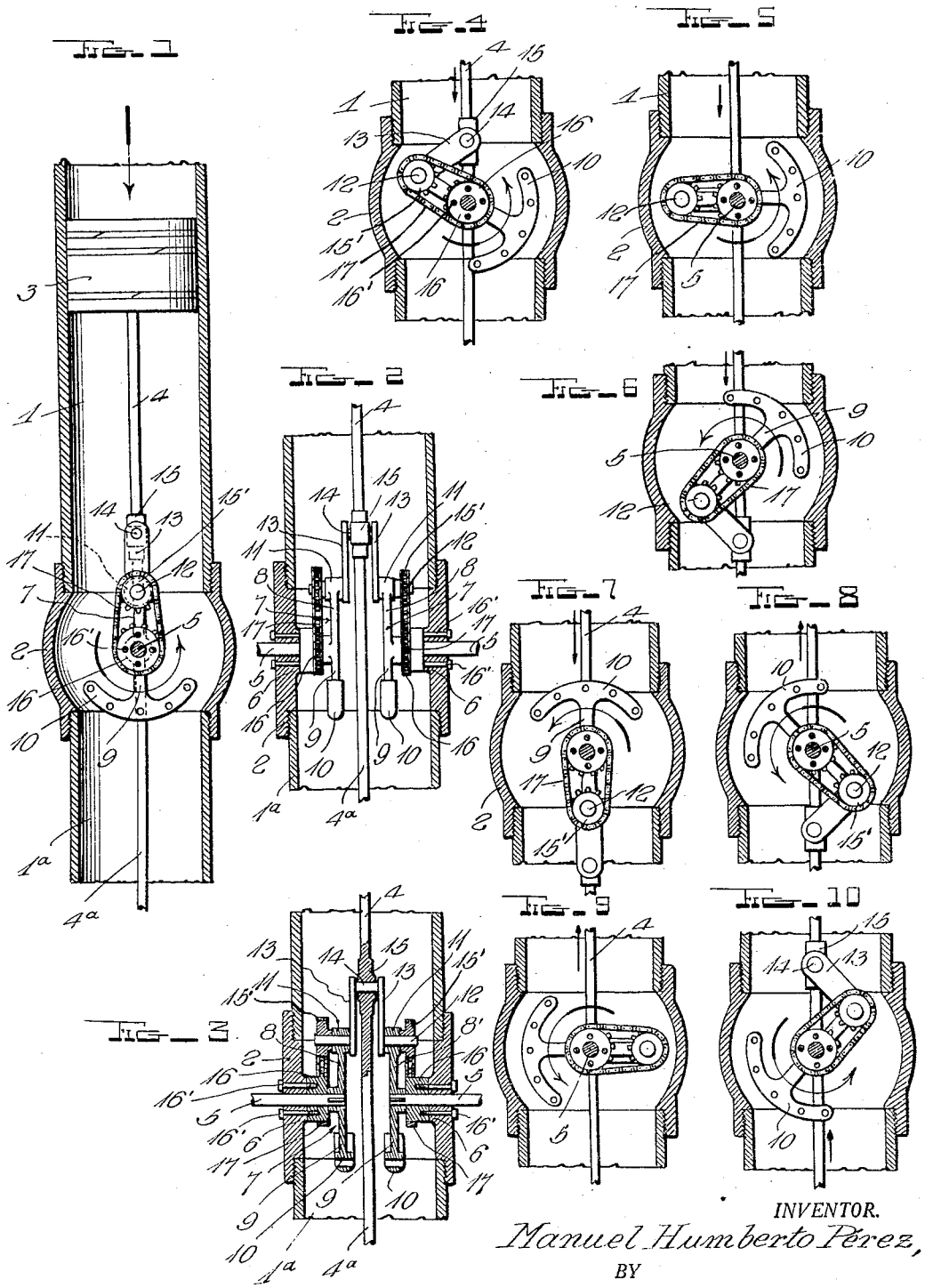
INVENTOR.
Manuel Humberto Pérez,
BY
ATTORNEY Patented Feb. 14, 1933

1,897,140

UNITED STATES PATENT OFFICE

MANUEL HUMBERTO PÉREZ, OF SAN PEDRO SULA, HONDURAS

MECHANICAL MOVEMENT

Application filed August 27, 1925, Serial No. 52,789. Renewed May 2, 1932.

This invention relates to mechanical movements, and has special reference to means adapted for use in the transmission of rectilinear motion into curvilinear motion, or vice versa. More especially the invention relates to a mechanical movement for use in connection with a crank coupling between a rotary element, such as a shaft, and a reciprocatory element, such as a rod, for the transmission of motion from one to the other, as, for example, the transmission of power from a piston impelled rod to a crank shaft from which the power is taken. The present invention is particularly valuable for use in air, steam, internal-combustion and other engines and other apparatus wherein a rotary shaft is driven through a connecting crank from an impulse piston, or, conversely, the piston or its equivalent is driven through a connecting crank from an impulse shaft.

In the present disclosure I have, for purposes of exemplification, shown the application of my invention to the crank connection between an engine piston rod and a crank shaft driven thereby from a working piston, although it is to be understood that it is not limited thereto, as the principle of the invention may be employed in various types of apparatus. As is well known, in an engine construction using a crank-driven connecting rod of ordinary type, the angularity of motion of the connecting rod requires the employment of a compensating pivotal connection between the rod and piston in order that the latter may be permitted to move in as nearly a rectilinear path as possible. Through the angularity of motion of the rod, however, the pivot is subjected to more or less wear and tear, requiring replacement of its bearing surfaces at more or less frequent intervals, and any looseness of the pivotal connections causes jerky motions and injurious strains on the engine mechanism. In addition, the angularity of motion of the rod causes more or less side motion of the piston, resulting in excessive friction and power losses and so-called "piston slap" producing uneven wear on the surfaces of the cylinder and piston, so that leakage of motive fluid and lubricant and further power losses occur.

One object of my invention is to provide simple, reliable and effective means for controlling a crank action between a rotary element and a reciprocatory element whereby the latter is permitted and caused at all times to move in a straight rectilinear path.

Another object of my invention is to provide a construction of means of the character described whereby a piston and its rod coupled by a crank to a rotary shaft may be permitted and caused to move in a straight rectilinear path, and whereby, if desired, the use of a pivotal connection between the rod and piston may be dispensed with.

Still another object of the invention is to provide a compensating and controlling means between a shaft crank and piston rod, such as of an engine, whereby the stated objections to prior engine structures are obviated in a simple and effective manner.

Still another object of the invention is to provide a crank and rod connection whereby motors of less than four cylinders and in fact having but a single working cylinder and piston may be equilibrated.

In the accompanying drawing,—

Figure 1 is a vertical longitudinal section through an engine embodying my invention, for example, an internal combustion engine, showing the piston at the limit of its compression or return stroke.

Figure 2 is a similar section taken at right angles to that shown in Figure 1 through a portion of the cylinder and the crank case and showing the crank mechanism in elevation.

Figure 3 is a view similar to Figure 2 but showing the crank mechanism in section.

Figures 4 to 10, inclusive, are views similar to Figure 1 showing, in connection with Figure 1, the positions of the parts of the crank mechanism successively at each eighth point in the orbit of revolution of the crank.

Referring now more particularly to the drawing, 1 designates an engine cylinder, connected at its base with a crank case 2, said cylinder having working therein a piston 3 coupled to the connecting rod 4. The rod 4 may be either fixedly or pivotally connected with the piston, as desired. Since, however, the rod 4 moves in a substantially straight line, a pivotal connection is not necessary.

Journaled in the crank case 2 is a crank shaft composed of two sections 5, one section journaled in each side wall of the crank case and in a bearing boss 6 fixed thereto. The inner ends of the crank shaft sections 5 are spaced apart, and to such inner ends of the crank case sections are fixed the members 7 of a divided, bifurcated or sectional crank. Each member 7 is fixed at a point intermediate of its length to one of the shaft sections 5 and extends beyond opposite sides thereof, one end of the member 7 forming a crank arm 8 and the other end of said member forming a counterbalancing arm 9, which counterbalancing arm carries a counterbalancing weight 10.

The crank arms 8 of the members 7 are provided at their free ends with bearing eyes 11 receiving wrist pins 12 which extend therethrough and are integral with or fixed to the inner ends of a pair of links 13 connected at their outer ends by a rigid wrist pin 14, pivotally engaging a bearing member on the rod 4, as indicated at 15. The parts 13 and 14 therefore form an auxiliary crank pivotally coupled at one end to the main crank 7 carried by the crank shaft sections 5 and pivotally coupled at its opposite end to the rod 4, whereby the propulsive force of the rod 4 will be transmitted to the main crank and crank shaft, for converting rectilinear motion into curvilinear motion, or propulsive force may be transmitted from the crank shaft and main crank to the rod for converting curvilinear motion into rectilinear motion. The parts 13 and 14 also provide a compensating connection between the rod and main crank whereby the main crank is permitted to have its usual orbit of motion, while the rod, through the compensating action of this connection, is relieved from having the angularity of motion which it would have if directly coupled to the main crank, and is permitted to reciprocate directly in a straight line. Fixed to the extended ends of the wrist pins 12 are sprocket gears 15′ which turn therewith, and carried by the bearing bosses 6 are sprocket gears 16, fixed against rotation to the bosses and crank case, as by screws 16′. Sprocket chains 17 connect the pairs of gears 15′—16 on each side of the crank mechanism. As the crank 7 turns the chains 17 run around the gears 15′ and shift about the gears 16, and hence the sprocket gearing while shifting to permit swing of the links turns about an axis coincident with the axis 5 and, as the radius of each chain 17 is equal to the radius of each arm 8, the sprocket gearing forms a working connection between the main crank and the swinging compensating connection which transmits working motion to carry the parts over dead centers and to at all times preserve a proper ratio of motion between such crank and rod in order to maintain their working relationship and adapt them to work in timed accord. The weights 10 counterbalance the weight of the crank connections and prevent any tendency of the parts to bind or hang on dead centers and act in effect like a fly wheel to maintain a smooth and easy continuity of motion.

The cylinder 1 and piston 4 may constitute such parts of an air engine, an internal combustion engine, or a steam engine, or any motor or mechanism in which a crank shaft and connecting rod or its equivalent are coupled for the transmission of motion from one to the other. Accordingly as it is desired to translate rectilinear into curvilinear motion or curvilinear motion into rectilinear motion, the power to be transmitted may be applied either to the rod 4 or shaft 5. The rod may be extended as at $4^a$, into a second cylinder $1^a$, arranged in alinement with the cylinder 1 and on the opposite side of the crank case 2, in the application of the invention, for example, to an engine having opposed cylinders, so that pistons in both cylinders may be coupled to one and the same crank mechanism for an obvious working action, and the number of cylinders, pistons and crank devices employed may be increased or multiplied to any degree desired.

Assuming that the cylinder 1 is the cylinder of an internal combustion engine, and that the piston 3 as shown in Figure 1 is at the limit of its compression stroke, it will be seen that in such position of the piston the parts of the cranks, at the beginning of a cycle, lie on the side of the shaft 5 facing the cylinder 1 and in longitudinal alinement with each other and in axial alinement with the cylinder and connecting rod 4. As the piston is impelled downwardly on its working motion on the firing of the charge, the crank elements successively assume the positions at each eighth point in the orbit of motion of the crank shown in Figures 4, 5, 6 and 7 at corresponding points in the piston travel until the piston reaches the end of its working stroke, at which time the crank has made one-half its revolution and reached the opposite position on the side of the shaft from that shown in Figure 1. In this one-half travel of the piston and crank, the wrist pin ends 12 of the links 13 swing with the crank arms 8 and transmit the working thrust of the rod 4 thereto, this swinging motion of the wrist pin ends 12 allowing the wrist-pin ends 14 of the links 13 to follow without deviation from the direct line of travel of the rod 4, so that the piston and rod will have a straight line motion. On the return motion of the piston and rod the parts of the crank mechanism successively and at each eighth point in the travel of the piston assume the positions shown in Figures 8, 9, 10 and 1, thus completing one cycle of action during which return movements of the crank elements the swing of the links allows the rod and piston to have a straight line backward travel. By this means, in the use of the invention in a motor, the objections incident to the use of ordinary crank and piston couplings are avoided and the disadvantages thereof overcome, preventing undue friction, piston slap and other undue wear and tear and power and other losses due both to friction and leakages. My invention accordingly reduces the amount of friction and wear and tear on the motor to the minimum, enables greater power to be obtained with less fuel, and increases the efficiency and prolongs the life of the motor. This novel and improved crank and rod connection also gives a highly efficient balancing or equilibrating action, so that motors of less than four cylinders and down to single-cylindered motors will be equilibrated and caused to act with great ease and smoothness. Furthermore, this invention lends itself perfectly to a motor using a long-stroke piston, allowing a greater proportion of the working pressure of the charge to be used and reducing loss of power caused by discharge of unused portions of the fuel through the exhaust.

While I have shown certain means for carrying my invention into practical effect, it is to be understood that the invention is not limited thereto, as any equivalent means, falling within the scope of the appended claims, may be employed without departing from the spirit or sacrificing any of the advantages of the invention.

Furthermore, it will be understood that the sizes and proportions of the parts may be varied in accordance with the character of the work to be performed. The sprocket wheels may be changed in diameter, whereby to vary the ratio therebetween, and the lengths of the levers changed to vary the stroke thereof.

Having thus fully described my invention, I claim:—

1. In a mechanical movement, a rotary shaft composed of alined sections, spaced members fixed to and rotatable with the shaft sections, each member comprising a crank arm extending beyond one side of the shaft and a counterweighted arm extending beyond the opposite side of the shaft, stationary gears arranged coaxially with the shaft sections, an auxiliary crank composed of spaced links provided at their inner ends with journals having bearing in the outer ends of the crank arms of the crank members, gears fixed to and rotatable with said journals, a wrist pin connecting the outer ends of the links, a reciprocatory rod coupled to said wrist pin, and sprocket chain connections between the stationary gears and the gears on the journals of the links.

2. In a mechanical movement, the combination of a pair of opposed bearing members, axially alined shaft sections journaled respectively in said bearing members, sprocket gears fixed to the bearing members coaxially with said shaft sections, main crank members fixed to and rotatable with the shaft sections and each comprising a crank arm extending beyond one side of the shaft and carrying a bearing sleeve and a counterweighted arm extending beyond the opposite side of the shaft, an auxiliary crank member comprising a pair of spaced links having journals at their inner ends having bearing in the bearing sleeves of the crank arms of the main crank members, sprocket gears fixed to and rotatable with said journals, a wrist pin connecting the links at their outer ends, a reciprocatory rod coupled to the wrist pin, and sprocket chains connecting said stationary sprocket gears and the sprocket gears on the journals of the links.

3. In a mechanical movement, the combination of a chamber having openings in opposite sides thereof, detachable bearing plates forming closures for said openings, axially alined shaft sections journaled respectively in said bearing plates, sprocket gears fixed to the bearing plates coaxially with said shaft sections, main crank members fixed to and rotatable with the shaft sections and each comprising a crank arm extending beyond one side of the shaft and carrying a bearing sleeve and a counterweighted arm extending beyond the opposite side of the shaft, an auxiliary crank member comprising a pair of spaced links having journals at their inner ends having bearing in the bearing sleeves of the crank arms of the main crank members, sprocket gears fixed to and rotatable with said journals, a wrist pin connecting the links at their outer ends, a reciprocatory rod coupled to the wrist pin, and sprocket chains connecting said stationary sprocket gears and the sprocket gears on the journals of the links.

In testimony whereof I affix my signature.

MANUEL HUMBERTO PÉREZ.